(12) United States Patent
Boff et al.

(10) Patent No.: US 7,067,213 B2
(45) Date of Patent: Jun. 27, 2006

(54) FLOW FIELD PLATE GEOMETRIES

(75) Inventors: James Charles Boff, Pinner (GB); Mark Christopher Turpin, Loughborough (GB)

(73) Assignee: The Morgan Crucible Company PLC, Windsor (GB)

(*) Notice: Subject to any disclaimer, the term of this patent is extended or adjusted under 35 U.S.C. 154(b) by 207 days.

(21) Appl. No.: 10/380,356

(22) PCT Filed: Feb. 5, 2002

(86) PCT No.: PCT/GB02/00491

§ 371 (c)(1),
(2), (4) Date: Mar. 13, 2003

(87) PCT Pub. No.: WO02/065566

PCT Pub. Date: Aug. 22, 2002

(65) Prior Publication Data

US 2004/0023100 A1    Feb. 5, 2004

(30) Foreign Application Priority Data

| Feb. 12, 2001 | (GB) | ................................. 0103390.1 |
| Feb. 12, 2001 | (GB) | ................................. 0103391.9 |
| May 3, 2001 | (GB) | ................................. 0110910.7 |
| May 3, 2001 | (GB) | ................................. 0110911.5 |
| May 3, 2001 | (GB) | ................................. 0110912.3 |
| Aug. 8, 2001 | (WO) | ..................... PCT/GB01/03584 |
| Oct. 11, 2001 | (GB) | ................................. 0124448.2 |
| Nov. 16, 2001 | (GB) | ................................. 0127525.4 |

(51) Int. Cl.
*H01M 8/00*   (2006.01)

(52) U.S. Cl. ............................... 429/34; 429/38

(58) Field of Classification Search ................ 429/34, 429/38, 39, 12
See application file for complete search history.

(56) References Cited

U.S. PATENT DOCUMENTS

| 3,278,336 A | * | 10/1966 | Uline et al. ..................... 429/35 |
| 3,814,631 A | | 6/1974 | Warszawski et al. |
| 5,108,849 A | | 4/1992 | Watkins et al. |
| 5,230,966 A | | 7/1993 | Voss et al. |
| 5,269,902 A | | 12/1993 | Khandkar et al. |
| 5,376,472 A | | 12/1994 | Hartvigsen et al. |
| 5,514,486 A | | 5/1996 | Wilson |
| 5,595,834 A | | 1/1997 | Wilson et al. |
| 5,641,586 A | * | 6/1997 | Wilson ........................ 429/30 |
| 5,686,199 A | | 11/1997 | Cavalea et al. |
| 5,728,446 A | | 3/1998 | Johnston et al. |
| 5,773,160 A | | 6/1998 | Wilkinson et al. |
| 6,007,933 A | | 12/1999 | Jones |
| 6,037,073 A | * | 3/2000 | Besmann et al. ............. 429/34 |
| 6,071,635 A | | 6/2000 | Carlstrom, Jr. |
| 6,087,033 A | | 7/2000 | Grüneet al. |
| 6,207,312 B1 | | 3/2001 | Wynne et al. |

(Continued)

FOREIGN PATENT DOCUMENTS

CA    2327962    6/2002

(Continued)

*Primary Examiner*—Michael Barr
*Assistant Examiner*—Monique Wills
(74) *Attorney, Agent, or Firm*—Dean W. Russell; Bruce D. Gray; Kilpatrick Stockton LLP

(57) ABSTRACT

A flow field plate for a fuel cell or electrolyser comprises on at least one face an assembly of channels comprising one or more gas delivery channels, and a plurality of gas diffusion channels of width less than 0.2 mm connecting thereto.

12 Claims, 5 Drawing Sheets

U.S. PATENT DOCUMENTS

| | | |
|---|---|---|
| 6,361,892 B1 | 3/2002 | Ruhl et al. |
| 6,555,261 B1 | 4/2003 | Lewinski et al. |
| 6,569,554 B1 | 5/2003 | Doggwiler et al. |
| 6,686,082 B1 | 2/2004 | Leger et al. |
| 2001/0005557 A1 | 6/2001 | Yosida et al. |
| 2002/0192531 A1 | 12/2002 | Zimmerman et al. |
| 2003/0108782 A1 | 6/2003 | Leger et al. |
| 2004/0058218 A1 | 3/2004 | Abderrahmane et al. |

FOREIGN PATENT DOCUMENTS

| | | | |
|---|---|---|---|
| DE | 10038589 | | 2/2002 |
| EP | 0328115 | | 8/1989 |
| EP | 0999605 | | 5/2000 |
| EP | 1017344 | | 7/2000 |
| EP | 1020942 | | 7/2000 |
| EP | 1215743 | | 6/2002 |
| GB | 2372143 | | 8/2002 |
| GB | 2372144 | | 8/2002 |
| GB | 2372626 | | 8/2002 |
| GB | 2375222 | | 11/2002 |
| GB | 2387476 | | 10/2003 |
| GB | 2403061 | | 12/2004 |
| JP | 58-164156 | | 9/1983 |
| JP | 61-256568 | | 11/1986 |
| JP | 64-63271 | | 3/1989 |
| JP | 3-276569 | | 12/1991 |
| JP | 6-267564 | | 9/1994 |
| JP | 7-288133 | | 10/1995 |
| JP | 8-45520 | | 2/1996 |
| JP | 10 032012 | | 2/1998 |
| JP | 11 016590 | | 1/1999 |
| JP | 11 016591 | | 1/1999 |
| JP | 11016590 | * | 1/1999 |
| WO | WO94/11912 | | 5/1994 |
| WO | WO94/21372 | | 9/1994 |
| WO | WO97/42672 | | 11/1997 |
| WO | WO97/50139 | | 12/1997 |
| WO | WO98/52242 | | 11/1998 |
| WO | WO99/09923 | | 3/1999 |
| WO | WO00/26981 | | 5/2000 |
| WO | WO00/41260 | | 7/2000 |
| WO | WO01/04982 | | 1/2001 |
| WO | WO01/31728 | | 5/2001 |
| WO | WO01/41231 | | 6/2001 |
| WO | WO01/41239 | | 6/2001 |
| WO | WO01/89019 | | 11/2001 |
| WO | WO02/17419 | | 2/2002 |
| WO | WO02/37592 | | 5/2002 |
| WO | WO02/065566 | | 8/2002 |
| WO | WO02/069426 | | 9/2002 |
| WO | WO02/090053 | | 11/2002 |
| WO | WO03/096453 | | 11/2003 |
| WO | WO03/096454 | | 11/2003 |
| WO | WO03/096455 | | 11/2003 |
| WO | WO03/096466 | | 11/2003 |
| WO | WO2004/001874 | | 12/2003 |
| WO | WO2004/114446 | | 12/2004 |

* cited by examiner

FLOW FIELD PLATE GEOMETRIES

This application claims priority to Great Britain Application No. 0103390.1 filed on Feb. 12, 2001; Great Britain Application No. 0103391.9 filed on Feb. 12, 2001; Great Britain Application No. 0110910.7 filed on May 3, 2001; Great Britain Application No. 0110911.5 filed on May 3, 2001; Great Britain Application No. 0110912.3 filed on May 3, 2001; International Application No. PCT/GB01/03584 filed on Aug. 8, 2001; Great Britain Application No. 0124448.2 filed on Oct. 11, 2001; Great Britain Application No. 0127525.4 filed on Nov. 16, 2001 and International Application No. PCT/GB02/00491 filed on Feb. 5, 2002 and published in English as International Publication No. WO 02/065566 A1 on Aug. 22, 2002, the entire contents of which are hereby incorporated by reference.

This invention relates to fuel cells and electrolysers, and is particularly, although not exclusively, applicable to proton exchange membrane fuel cells and electrolysers.

Fuel cells are devices in which a fuel and an oxidant combine in a controlled manner to produce electricity directly. By directly producing electricity without intermediate combustion and generation steps, the electrical efficiency of a fuel cell is higher than using the fuel in a traditional generator. This much is widely known. A fuel cell sounds simple and desirable but many man-years of work have been expended in recent years attempting to produce practical fuel cell systems. An electrolyser is effectively a fuel cell in reverse, in which electricity is used to split water into hydrogen and oxygen.

Both fuel cells and electrolysers are likely to become important parts of the so-called "hydrogen economy". In the following, reference is made to fuel cells, but it should be remembered that the same principles apply to electrolysers. One type of fuel cell in commercial production is the so-called proton exchange membrane (PEM) fuel cell [sometimes called polymer electrolyte or solid polymer fuel cells (PEFCs)]. Such cells use hydrogen as a fuel and comprise an electrically insulating (but ionically conducting) polymer membrane having porous electrodes disposed on both faces. The membrane is typically a fluorosulphonate polymer and the electrodes typically comprise a noble metal catalyst dispersed on a carbonaceous powder substrate. This assembly of electrodes and membrane is often referred to as the membrane electrode assembly (MEA).

Hydrogen fuel is supplied to one electrode (the anode) where it is oxidised to release electrons to the anode and hydrogen ions to the electrolyte. Oxidant (typically air or oxygen) is supplied to the other electrode (the cathode) where electrons from the cathode combine with the oxygen and the hydrogen ions to produce water. A sub-class of proton exchange membrane fuel cell is the direct methanol fuel cell in which methanol is supplied as the fuel. This invention is intended to cover such fuel cells and indeed any other fuel cell using a proton exchange membrane.

In commercial PEM fuel cells many such membranes are stacked together separated by flow field plates (also referred to as bipolar plates). The flow field plates are typically formed of metal or graphite to permit good transfer of electrons between the anode of one membrane and the cathode of the adjacent membrane. The flow field plates have a pattern of grooves on their surface to supply fluid (fuel or oxidant) and to remove water produced as a reaction product of the fuel cell.

Various methods of producing the grooves have been described, for example it has been proposed to form such grooves by machining, embossing or moulding (WO00/41260), and (as is particularly useful for the present invention) by sandblasting through a resist (WO01/04982).

International patent application No. WO01/04982 disclosed a method of machining flow field plates by means of applying a resist or mask to a plate and then using sandblasting (or other etching method using the momentum of moving particles to abrade the surface, e.g. waterjet machining), to form features corresponding to a pattern formed in the mask or resist.

Such a process was shown by WO01/04982 as capable of forming either holes through the flow field plates, or closed bottom pits or channels in the flow field plates. The process of WO01/04982 is incorporated herein in its entirety, as giving sufficient background to enable the invention.

In practice, the majority of plates made to date have been formed by milling the channels.

WO00/41260 discloses a flow field geometry in which substantially straight parallel channels are provided of a width less than about 0.75 mm.

WO00/26981 discloses a similar geometry in which highly parallel flow channels of a width less than 800 μm separated by lands of less than 800 μm are used. This geometry is stated to improve gas distribution as reducing the need for lateral gas dispersion through the MEA (referred to in WO00/26981 as the DCC [diffusion current collectors]). The geometry is also stated to reduce electrical resistance as it reduces the electrical path length to land areas. There is a conflict between electrical and gas properties described in WO00/26981, in that reduced land areas are stated to increase electrical resistance. WO00/26981 states that these conflicting requirements may be optimised. WO00/26981 states that the pattern of highly parallel microchannels may contain interconnections or branch points such as in hatchings or grid patterns. One advantage of the use of narrow channels is stated to be that this encourages water droplet formation across the channels so permitting efficient water removal. However this advantage may not be seen where a grid pattern is used as the pressure either side of a water droplet is likely to be substantially equal.

Cited against WO00/26981 are:
U.S. Pat. No. 3,814,631, which discloses an electrode construction in which micro-channels of more than 0.3 mm wide are provided in a frame edge leading to a textured electrode in which protrusions on one face of the electrode match depressions in the opposed face of the electrode.
U.S. Pat. No. 5,108,849, which discloses a plate having serpentine tracks of 0.76 mm (0.03 inch) width or more with land widths of 0.254 mm (0.01 inch) or more.
WO94/11912, which discloses a plate having discontinuous tracks of 0.76 mm (0.03 inch) width and depth. These tracks may be interdigitated.
WO98/52242, which discloses means for humidifying the membrane, Narrow channels are known for other devices, for example, WO94/21372 discloses a chemical processing apparatus comprising a three dimensional tortuous channel formed by aligning part channels in adjacent discs. Such a construction has not been used for a fuel cell.

None of the fuel cell related patents disclose a structure of coarse gas delivery channels leading to fine gas diffusion channels. To ensure that the fluids are dispersed evenly to their respective electrode surfaces a so-called gas diffusion layer (GDL) is placed between the electrode and the flow field plate. The gas diffusion layer is a porous material and typically comprises a carbon paper or cloth, often having a bonded layer of carbon powder on one face and coated with a hydrophobic material to promote water rejection. It has been proposed to provide an interdigitated flow field below a macroporous material (U.S. Pat. No. 5,641,586) having connected porosity of pore size range 20–100 μm allowing a reduction in size of the gas diffusion layer. Such an arrangement permits gas flow around blocked pores, which is disadvantageous. Build up of reactant products (such as water) can occur in these pores reducing gas transport efficiency. Additionally, such a structure increases the thickness of the flow field plate.

The inventors have analysed what happens in a fuel cell and have come to the conclusion that the gas diffusion layer does not do what it's name implies. The theory had been that the gas diffusion layer serves to permit gas to diffuse across the whole surface of the membrane so that large portions of the membrane are active in the cell reaction. The inventors have found that, in simple models, the gas appears not to access the whole of the lands between the channels, but only the area above the channels and a small margin surrounding the channels, the majority of the electricity generation taking place in this restricted region. This is supported by the observation that interdigitated channels show higher electrical efficiencies since the gas is forced into the areas above the lands. The gas diffusion layer does however actually serve a useful purpose in carrying current from those areas of the membrane electrode above the channels to the lands, and in providing mechanical support to the membrane electrode to prevent it being squeezed into the channels. Several inventors have proposed stiffening the membrane electrode.

The gas diffusion layer in carrying current from those areas where electricity is generated to the lands, does of course result in electrical losses due to the electrical resistance of the gas diffusion layer. Present day gas diffusion layers are chosen as a delicate balance between the needs of mechanical strength, electrical conductivity, and gas permeability.

A combined flow field plate and gas diffusion layer has been described in U.S. Pat. No. 6,037,073 and comprises a selectively impregnated body of porous carbon material, the impregnation hermetically sealing part of the plate. Such an arrangement has the drawbacks that it is complicated to make reproducibly and that it permits gas flow around blockages as in U.S. Pat. No. 5,641,586.

An assembled body of flow field plates and membranes with associated fuel and oxidant supply manifolds is often referred to a fuel cell stack.

Although the technology described above has proved useful in prototype and in some limited commercial applications, to achieve wider commercial acceptance there is now a demand to reduce the physical size of a fuel cell stack and to reduce its cost. Accordingly, a reduction in the number of components could have beneficial results on size and cost (both through material and assembly costs).

Also, the prior art flow field plates have provided flow fields of serpentine, linear, or interdigitated form but have not looked to other physical systems for improving the gas flow pathways. Such existing flow field patterns tend to have a problem with gas "short circuiting" by passing from one channel to an adjacent channel having a significantly lower pressure.

The inventors have realised that by forming sufficiently fine channels on the face of the flow field plates the purpose of distributing the gas evenly across the electrodes can be achieved without the use of a separate gas diffusion layer. The membrane can be prevented from falling into the channels by use of a stiffened membrane or lower clamping pressures as appropriate.

The inventors have further realised that by looking to physiological systems (the lung) improved flow field geometries may be realised that are likely to have lower parasitic losses due to their shorter gas flow pathways. They have also realised that such geometries are less likely to suffer from gas short-circuiting.

Additionally, the inventors have realised that use of narrow tracks results in a reduction in resistive electrical losses in the gas diffusion layer, since there will be shorter pathways from the electrically active regions of the membrane electrode to the lands between the channels. Conversely, as the pathways from the electrically active regions of the membrane electrode to the lands between the channels are shorter, then a higher resistance gas diffusion layer can be tolerated so permitting a wider range of materials to be considered for the gas diffusion layer.

The present invention therefore provides a flow field plate for a fuel cell comprising on at least one face an assembly of channels comprising one or more gas delivery channels, and a plurality of gas diffusion channels of width less than 0.2 mm connecting thereto.

The gas delivery channels may comprise one or more primary channels of a width greater than 1 mm, and a plurality of secondary gas delivery channels of a width less than 1 mm connecting thereto.

The gas diffusion channels may form a branched structure.

The gas diffusion channels may be of varying width, forming a branched structure of progressively diminishing channel width similar to the branching structure of blood vessels and air channels in the lung.

The invention is illustrated by way of non-limitative example in the following description with reference to the drawing in which.

To form both gas delivery and gas diffusion channels a technique such as sand blasting may be used in which a template or resist is placed against the surface of a plate, the template or resist having a pattern corresponding to the desired channel geometry. Such a technique is described in WO01/04982, which is incorporated herein in its entirety as enabling the present invention. With this technique the plates may be formed from a graphite/resin composite or other non-porous electrically conductive material that does not react significantly with the reactants used.

Figure 1:
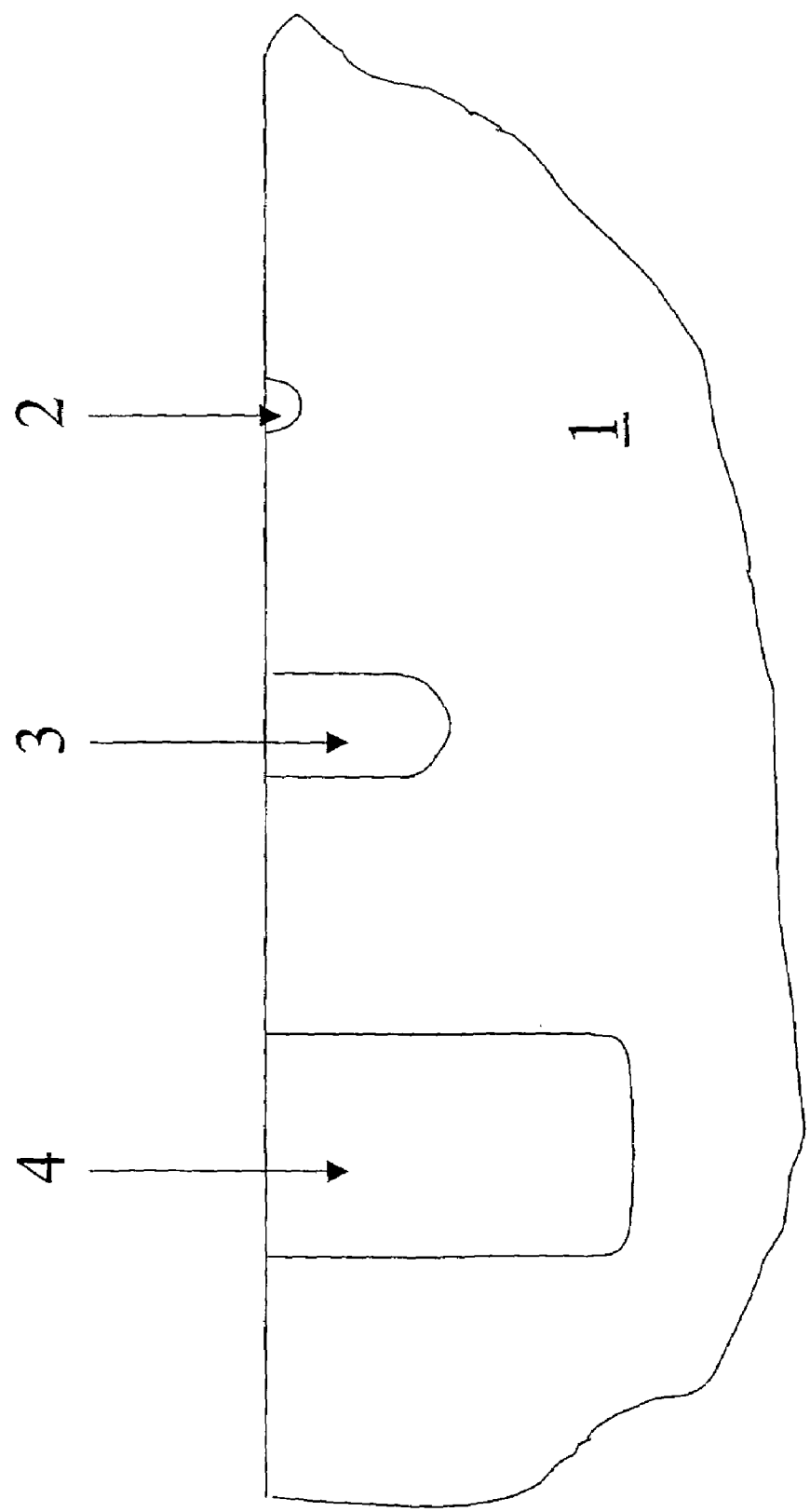
FIG. 1 shows schematically in part section a part of a fluid flow plate incorporating gas delivery channels and gas diffusion channels formed by sandblasting.

It is found with this technique that the profiles of channels of different width vary due to the shadow cast by the mask. FIG. 1 shows a flow field plate 1 having a narrow channel 2 formed in its surface. Because of the shadowing effect of the resist used in forming the channel the channel is exposed to sandblast grit coming effectively only from directly above. This leads to a generally semicircular profile to the channel and to a shallow cutting of the channel.

For progressively larger channels (3 and 4) the resist casts less of a shadow allowing sandblasting grit from a progressively wider range of angles to strike the surface of the flow field plate, so allowing both deeper cutting of the surface and a progressively flatter bottom to the channel.

Accordingly, by applying a resist with different width channels to a plate and exposing the plate and resist to sandblasting with a fine grit, a pattern of channels of different widths and depths can be applied.

Applying such a pattern of channels of varying width and depth has advantages. In flow field plates the purpose behind the channels conventionally applied is to try to ensure a uniform supply of reactant material to the electrodes and to ensure prompt removal of reacted products. However the length of the passage material has to travel is high since a convoluted path is generally used.

Another system in which the aim is to supply reactant uniformly to a reactant surface and to remove reacted products is the lung. In the lung an arrangement of progressively finer channels is provided so that air has a short pathway to its reactant site in the lung, and carbon dioxide has a short pathway out again. By providing a network of progressively finer channels into the flow field plate, reactant gases have a short pathway to their reactant sites.

The finest channels could simply discharge into wide gas removal channels or, as in the lung, a corresponding network of progressively wider channels could be provided out of the flow field plate. In the latter case, the two networks of progressively finer channels and progressively wider channels could be connected end-to-end or arranged as interdigitated networks with diffusion through a gas diffusion layer or through the electrode material providing connectivity. Connection end-to-end provides the advantage that a high pressure will be maintained through the channels, assisting in the removal of blockages.

Figure 2:
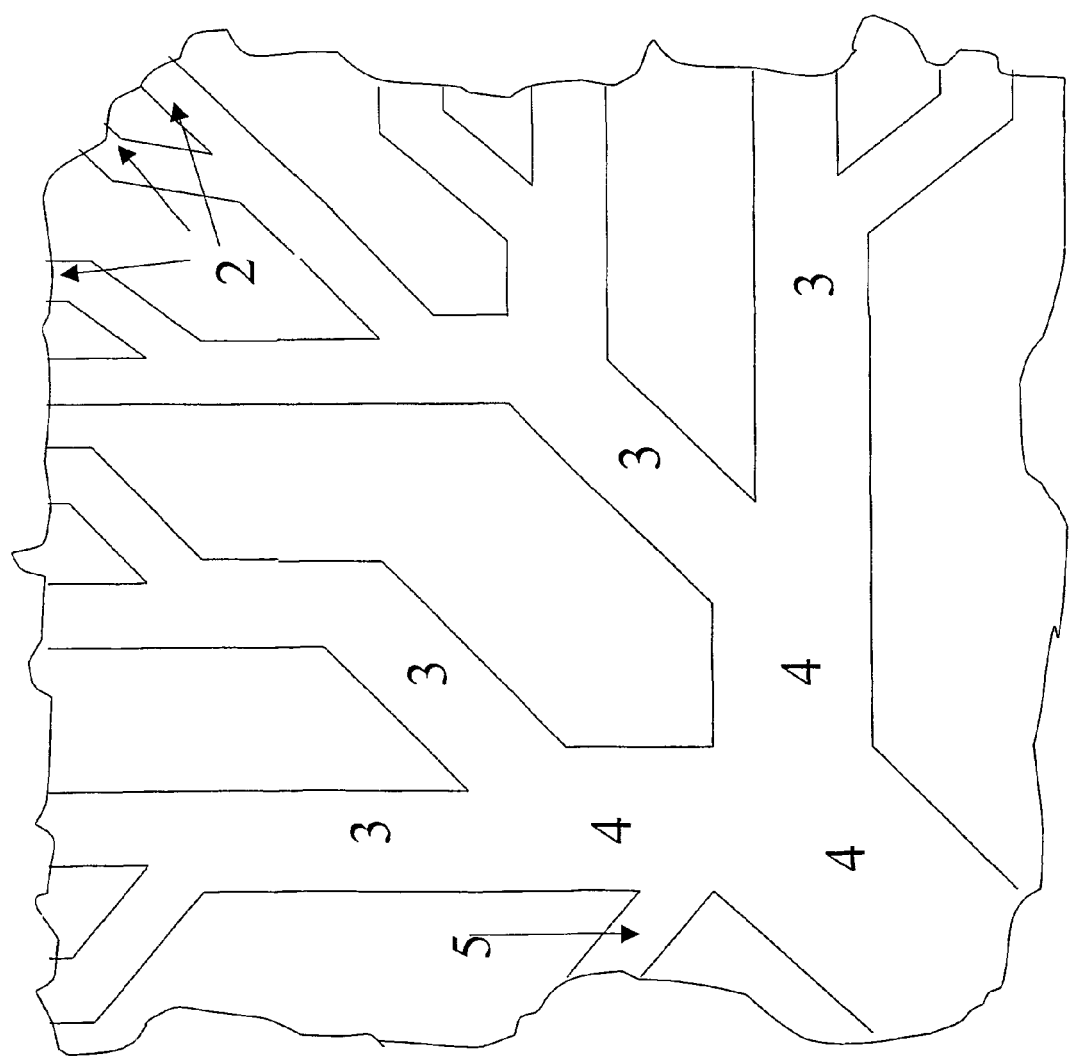
FIG. 2 shows schematically a partial plan view of a fluid flow plate incorporating gas delivery channels and gas diffusion channels.

FIG. 2 shows in a schematic plan a portion of a flow field plate having broad primary gas delivery channels 4, which diverge into secondary gas delivery channels 3 which themselves diverge into gas diffusion channels 2. Gas diffusion channels 5 can also come off the primary gas delivery channels 4 if required. The primary and secondary gas delivery channels may each form a network of progressively finer channels as may the gas diffusion channels and the arrangement of the channels may resemble a fractal arrangement.

The primary gas delivery channels may have a width of greater than 1 mm, for example about 2 mm. The depth of such a channel is limited only by the need to have sufficient strength in the flow field plate after forming the channel. A typical channel is about 40% of the plate thickness. On current plates (6 mm thick) the channels are typically 2.5 mm deep. As the plate becomes thinner then the channel depth will reduce. However, the catalyst and GDL are soft materials that will intrude into a channel with a low aspect ratio (shallow and wide). Preferably therefore the aspect ratio of the channels is typically between 0.5 and 2. The secondary gas delivery channels may have a width of less than 1 mm, for example 0.5 mm and may be shallower than the primary gas delivery channels. The gas diffusion channels have a width of less than 0.2 mm, for example about 100 μm and may be shallower still.

By providing such a structure, reactant products have a short distance to travel and can be removed efficiently in comparison with conventional plate designs. Additionally, gas channels in typical bipolar plates are of square or rectangular section and are millimetric in size. E.g. Ballard™ plates have a 2.5 mm square section channel. APS™ plates have a channel that is 0.9 mm wide by 0.6 mm deep. Smaller channels are beneficial as the pressure drop per unit length is higher and the pressure drop is what drives the reactants into the diffusion media.

Figure 3:
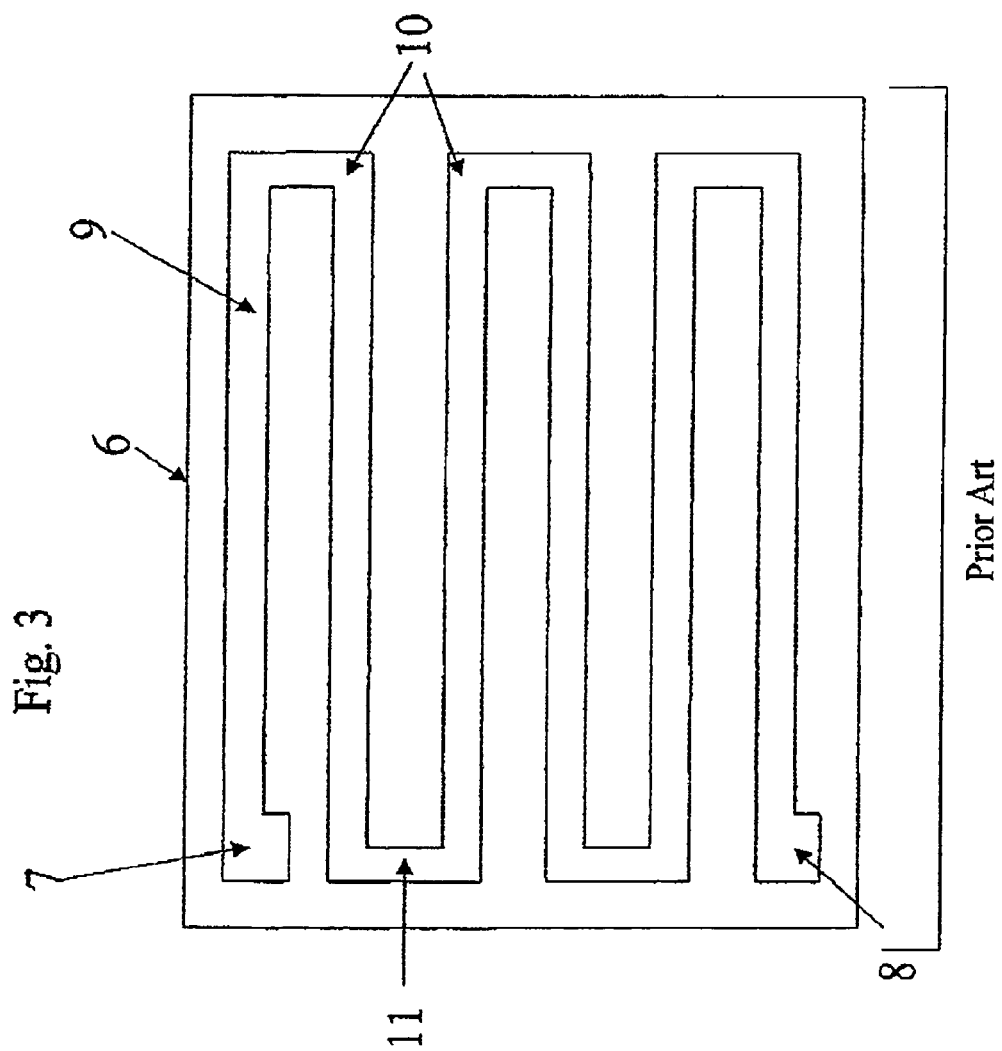
FIG. 3 shows schematically a prior art design flow field plate to illustrate the problem of short circuiting.

In a conventional flow field plate 6, as shown in FIG. 3, gas (fuel or oxidant) enters a first port 7 and exits a second port 8. The gas flows in a serpentine channel 9 from port 7 to port 8 diminishing in pressure as it does so. It will be appreciated that at certain parts 10 of the track the pressure differential between adjacent tracks is high and this can result in gas short-circuiting the channel so that other parts 11 are starved of fuel or oxidant. This short circuiting occurs by the gas passing between the membrane electrode and the face of the flow field plate. Most current plates have a pressure differential ($\Delta P$) between inlet and outlet of <100 mbar on the air side. Interdigitated plates have high $\Delta P$, typically about 3 times atmospheric pressure.

In contrast, in the present invention, adjacent tracks may be designed to have broadly similar pressures, so reducing the risk of short-circuiting.

WO00/41260 has an extensive discussion of flow field design but has not appreciated that be providing extremely fine channels (less than 0.2 mm) and by providing such channels as part of a network of progressively diminishing width, the pressure drop between adjacent channels is minimised so avoiding short-circuiting of the flow field.

The primary channel(s) must be of a size sufficient to deliver the working volume of gas required by the cell. This is about 25 L/min per kW of working power.

The flow field plates may be used with a gas diffusion layer, or the gas diffusion channels may be provided in a sufficient density over the surface of the flow field plate to provide sufficient gas delivery that a gas diffusion layer may be omitted, or significantly reduced in thickness. Such reduction is considered advantageous as the GDL component is a major contributor to resistive losses in the cell.

The limit on channel width is a function of the mask thickness used in the sand blast process. Image Pro™ materials (Chromaline Corp. US), are very thick at 125 micron. These masks limit track width to about 100 microns. Other mask materials can be spray coated onto the substrate and exposed in situ. These materials are much more resilient and hence can be much thinner. Chromaline SBX™ can be used to etch features down to 10–20 microns wide.

Figure 4:
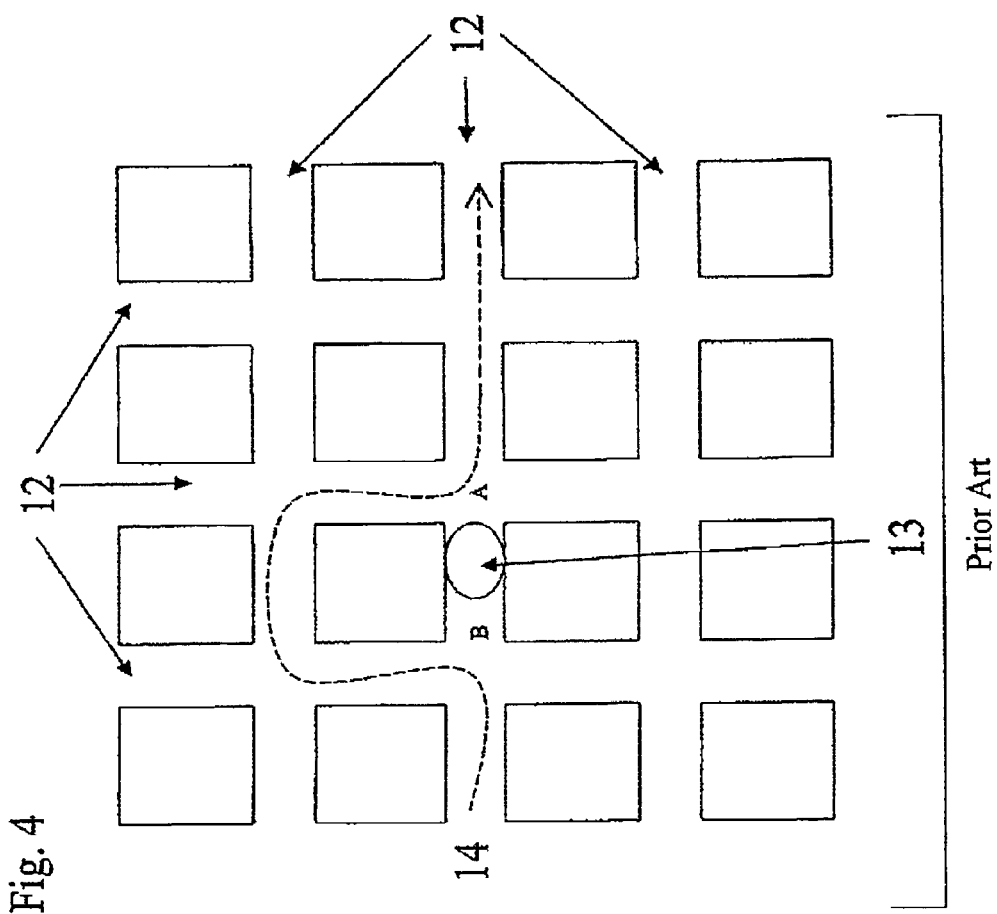
FIG. 4 shows schematically a prior art arrangement of channels.

WO0/26981 discusses the use of flow fields having parallel channels which may have branching or interconnecting points such as hatchings or grid patterns. Such a pattern has significant drawbacks and is shown schematically in FIG. 4. As indicated in FIG. 4, a grid of channels 12 is provided. If a droplet of water 13 blocks one of the channels, reactant gas can easily flow around the droplet following arrow 14. This will result in the pressure downstream (A) of the droplet being very close to the pressure upstream (B) and so there will be little driving force to remove the droplet.

Figure 5:
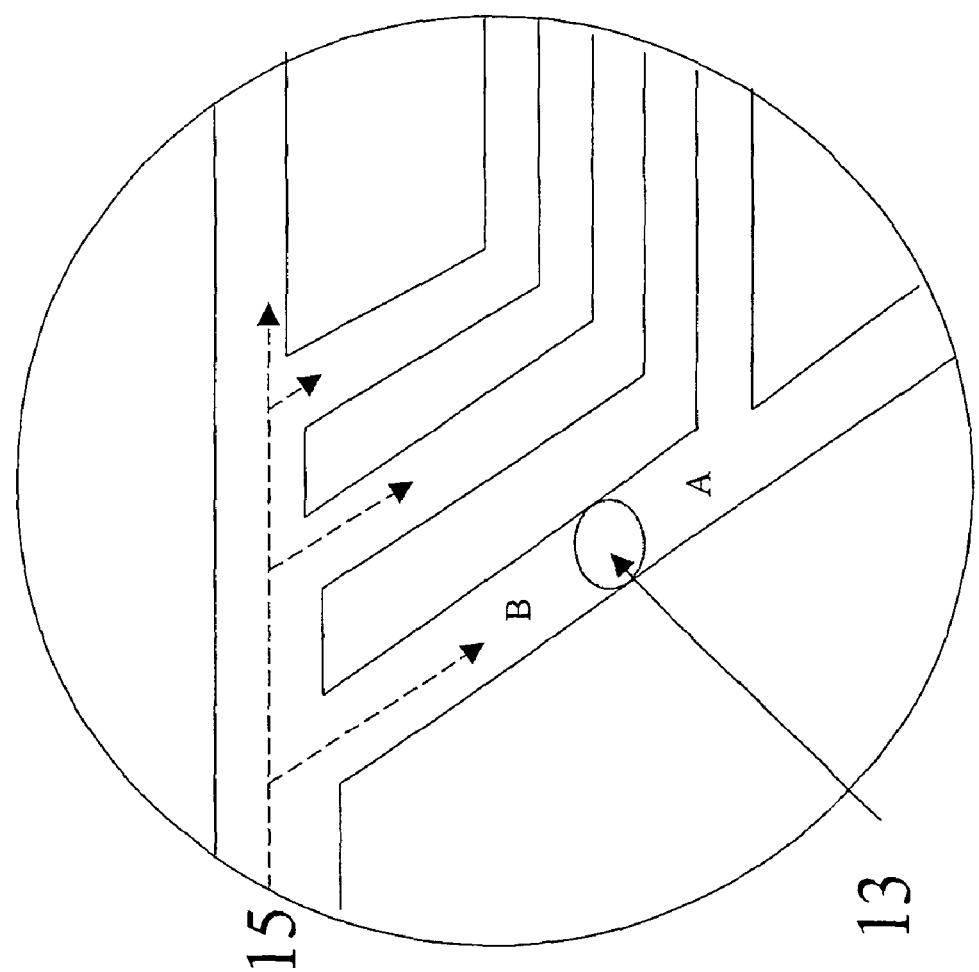
FIG. 5 shows a part section of a branched flow field pattern in accordance with the present invention.

In contrast, with a branched flow field as shown in FIG. 5, gas flows in a branching pattern 15 the pathway for reactant gas from the upstream side of droplet 13 to the downstream side of droplet 13 is long—effectively to the end of the flow field and back again. This means that the pressure upstream (B) of the droplet will be significantly higher than the pressure downstream (A), so providing a driving force for removal of water.

As well known, (see for example WO00/41260) the same pattern of grooves does not need to be applied to both faces of a flow field plate and the present invention is not limited in this way.

It is known to provide flow field plates comprising an electrically conductive core and a non-conductive frame (e.g. WO97/50139, WO01/89019, and U.S. Pat. No. 3,278, 336). The flow fields of the present invention may be used in such arrangements, with either the entire flow field being on the conductive core, or being partially on the non-conductive frame and partially on the conductive core.

What is claimed is:

1. A fuel cell flow field plate comprising on at least one face an assembly of channels comprising one or more gas delivery channels, and a plurality of gas diffusion channels of width less than 0.2 mm connecting thereto; wherein the gas delivery channels are wider than the gas diffusion channels.

2. An electrolyser flow field plate comprising on at least one face an assembly of channels comprising one or more gas delivery channels, and a plurality of gas diffusion channels of width less than 0.2 mm connecting thereto; wherein the gas delivery channels are wider than the gas diffusion channels.

3. A flow field plate as claimed in claim 1, wherein the gas delivery channels comprise one or more primary channels of a width greater than 1 mm, and a plurality of secondary gas delivery channels of a width less than 1 mm connecting thereto.

4. A flow field plate as claimed in claim 1, wherein the gas diffusion channels form a branched structure.

5. A flow field plate as claimed in claim 4, wherein the gas diffusion channels are of varying width forming a branched structure of progressively diminishing channel width.

6. A flow field plate as claimed in claim 1, comprising a first assembly of channels for gas delivery and a second assembly of channels for removal of reactant products.

7. A flow field plate as claimed in claim 6, wherein the first and second assemblies of channels are interdigitated.

8. A flow field plate as claimed in claim 1, wherein channels decrease in depth with diminishing width.

9. A flow field plate as claimed in claim 1, wherein the gas diffusion channels are provided in a sufficient density over the surface of the flow field plate as to form an integral gas diffusion layer.

10. A flow field plate as claimed in claim 1, comprising an electrically conductive core and a non-conductive frame.

11. A fuel cell stack comprising a plurality of flow field plates as claimed in claim 9.

12. A flow field plate as claimed in claim 2, wherein the gas delivery channels comprise one or more primary channels of a width greater than 1 mm, and a plurality of secondary gas delivery channels of a width less than 1 mm connecting thereto.

* * * * *